United States Patent [19]

Gilmer

[11] 4,429,066
[45] Jan. 31, 1984

[54] ADDITIVE FOR COATING COMPOSITIONS CONTAINING N-PROPYL AMINE SALT OF SULFONIC ACID

[75] Inventor: Thomas C. Gilmer, Media, Pa.

[73] Assignee: E. I. Du Pont de Nemours and Company, Wilmington, Del.

[21] Appl. No.: 430,842

[22] Filed: Sep. 30, 1982

[51] Int. Cl.$^3$ .................... C08K 3/36; C08K 3/08
[52] U.S. Cl. .................... 524/158; 106/287.21; 106/287.26; 106/287.27; 106/287.3; 106/287.32; 106/287.34; 106/308 N; 106/308 M; 106/308 S; 524/104; 524/441; 524/492; 524/493; 524/512; 524/516; 524/251
[58] Field of Search ............ 106/287.21, 287.26, 106/287.27, 287.3, 287.32, 287.34, 308 N, 308 M, 308 S; 524/158, 104, 441, 512, 492, 493, 516

[56] References Cited

U.S. PATENT DOCUMENTS

| | | | |
|---|---|---|---|
| 3,607,822 | 9/1971 | Nishino | 260/37 |
| 3,630,954 | 12/1971 | Yates | 252/313 S |
| 3,656,981 | 4/1972 | Beschke et al. | 106/308 N |
| 4,238,387 | 12/1980 | Antonelli | 260/42.29 |
| 4,276,212 | 6/1981 | Khanna et al. | 260/39 R |
| 4,330,458 | 5/1982 | Spinelli et al. | 524/512 |
| 4,338,379 | 7/1982 | Strolle et al. | 524/512 |

FOREIGN PATENT DOCUMENTS

| | | | |
|---|---|---|---|
| WO81/00826 | 4/1981 | PCT Int'l Appl. | 525/162 |
| 2074588 | 11/1981 | United Kingdom | 524/512 |

OTHER PUBLICATIONS

Derwent Abs. 83431 C/47, (Oct. 1980), J55129463.
Derwent Abs. 37667 B/20, (Apr. 1979), J54043237.
Derwent Abs. 37817 B/20, (Apr. 1979), J54043938.
Chem Abs. 59644g, vol. 71, (1969), Deutsche Gold.
"Cab-O-Sil in Coatings"-Suppliers Literature of the Cabot Corporation, pp. 1-17.
"Techniques for Producing Thixotropic Paints"-Pigments and Resin Technology, Jul. 1982, pp. 4-9.

*Primary Examiner*—John C. Bleutge
*Assistant Examiner*—Herbert J. Lilling
*Attorney, Agent, or Firm*—Hilmar L. Fricke

[57] ABSTRACT

An additive for use in high solids coating compositions which is a blend of
 (1) colloidal silica,
 (2) a polymeric bridging agent,
 (3) an aromatic sulfonic acid, and
 (4) n-propyl amine;
high solids coating compositions containing this additive have excellent shelf viscosity stability and finishes of such compositions and have excellent gloss and appearance and can be used as exterior finishes on automobiles and trucks.

19 Claims, No Drawings

ADDITIVE FOR COATING COMPOSITIONS CONTAINING N-PROPYL AMINE SALT OF SULFONIC ACID

BACKGROUND OF THE INVENTION

This invention relates to an additive for high solids coating compositions that improves appearance of a finish of the compositions.

High solids coating compositions containing a relatively low molecular weight acrylic polymer and an alkylated melamine crosslinking resin are known in the art as shown by Thompson et al. U.S. Pat. No. 4,330,458 issued May 18, 1982 and Khanna et al. U.S. Pat. No.4,276,212 issued June 30, 1981. These compositions require a strong acid catalyst to catalyze the crosslinking reaction and provide adequate cure at typical baking temperatures of about 125° C. To provide a stable coating composition, an amine is added to neutralize the acid. After application of the coating composition to a substrate, the composition is baked and during baking the amine is released to unblock the acid to catalyze the reaction. Many conventional amines cause problems such as poor stability of the composition during storage, inhibition of cure during baking or cause the finish to have a poor appearance resulting from a differential rate of curing which causes macrowrinkling and low gloss. These coating compositions often have other problems such as sagging of the finish on application and improper orientation of metallic flake pigments which cause a poor appearance.

There is a great need for an additive for high solids coating compositions that will neutralize the acid and provide a storage stable compositions, that will unblock during baking and allow the acid to catalyze the crosslinking reaction and cure the finish, reducing sagging of the finish on application and provide for proper orientation of metallic flakes used in the coating to enhance the appearance of the finish. High solids coating compositions containing such an additive will be acceptable for use in coating automobiles and trucks.

SUMMARY OF THE INVENTION

The additive for high solids coating compositions is a blend of about
(1) 50-87.5% by weight, based on the weight of the additive, of colloidal silica,
(2) 0.5-5.0% by weight, based on the weight of the additive, of a polymeric bridging agent,
(3) 10-30% by weight, based on the weight of the additive, of an aromatic sulfonic acid and
(4) 2-15% by weight, based on the weight of the additive, of n-propyl amine.

DESCRIPTION OF THE INVENTION

The additive can be used in a wide variety of high solids coating compositions and provide the above advantages. Typical high solids coating compositions in which the additive can be used have as the binder of film forming constituents the following: acrylic polymers with reactive groups such as hydroxyl, carboxyl, glycidyl, amide or a mixture of any of these groups and a crosslinking resin such as an alkylated melamine resin or a polyisocyanate, or a blend of acrylic and polyester resins and the aforementioned crosslinking resins or hydroxyl terminated polyester resin and the aforementioned crossslinking agents or epoxy resins or epoxy ester and alkylated melamine crosslinking resins or alkyd resins with or without drying oil groups which can be blended with alkylated melamine resins or polyisocyanate or other film-forming binders. To crosslink the coating composition after application to a substrate at baking temperatures of 125° C. and above, an acid catalyst is used such as an aromatic sulfonic acid. To provide the coating composition with relatively long term storage stability, the acid catalyst is blocked with n-propyl amine to form an acid salt. This salt readily unblocks under the above baking conditions to provide acid to catalyze the crosslinking reaction.

The additive contains about 50-87.5% by weight, based on the weight of the additive, of colloidal silica and preferably about 60-75% by weight of colloidal silica. Preferably, the colloidal silica is hydrophilic and has a particle size of about 0.2-1000 millimicrons and a surface area of about 50-1200 square meters per gram. Silica is usually about 99.8% silicon dioxide by weight (on a moisture free basis) and exists in three dimensional branched chain aggregates and has a surface that is hydrophilic and capable of hydrogen bonding.

One particularly preferred silica is a colloidal fumed silica with a hydrophilic surface having a surface area of about 100-500 square meters per gram and a nominal particle size (assuming spherical particles) of about 5-20 millimicrons.

The additive contains about 0.5-5.0% by weight, based on the weight of the additive, of a polymeric bridging agent and preferably about 0.5-3.0% by weight of the bridging agent.

Useful polymeric bridging agents are as follows: nonionic fluorocarbon polymers, polyethylene glycol and polyvinyl pyrrolidone.

Useful nonionic fluorocarbon polymers have ethylene oxide linkages and a weight average molecular weight of about 5,000-50,000 and contain about 2-25% by weight, based on the weight of the fluorocarbon polymer, of fluorine. One preferred nonionic fluorocarbon polymer contains about 30-70% by weight of ethylene oxide linkages, 10-20% by weight of fluorine and has a weight average molecular weight of about 10,000-30,000.

Polyvinyl pyrrolidones used in the additive have a weight average molecular weight of about 3,000-500,000. One preferred polyvinyl pyrrolidone has a weight average molecular weight of about 100,000-200,000. Another preferred polyvinyl pyrrolidone has a weight average molecular weight of about 300,000-400,000.

Copolymers and terpolymers of vinyl pyrrolidone can be used containing up to 50% by weight of other compatible polymerized units. Typical monomers that can be used are as follows: vinyl acetate, vinyl chloride, vinyl stearate, methylacrylate, styrene, diethyl hexyl maleate, didodecyl maleate, diethylene glycol bis(allyl carbonate), maleic anhydride, styrene, n-vinyl carbazole, vinyl laurate, acrylamide, allyl acetate, allyl alcohol, crotonic acid, diallyl phthalate, dimethylaminoethyl vinyl sulfide, dimethylvinylethynylcarbinol, divinyl benzene, divinyl tetrachlorobenzene, itaconic acid, methacrylamide, methoxy styrene, methylene diacrylamide, methyl vinyl ketone, methyl vinyl pyrrolidone, tetramethyallyl isocyanurate, trichloroethylene, vinylene carbonate, vinylimidazole, vinyl methyl benzimidazole, vinyl methyl dichlorosilane, vinyl methyl oxazolidinone, vinyl oxyethylurea, vinyl propionate, vinyl pyridine, ethylene oxide, and vinyl siloxanes.

Useful polyethylene glycols have a weight average molecular weight of about 800–400,000. One preferred polyethylene glycol has a weight average molecular weight of about 6,000–10,000.

Adducts of polyethylene glycol also can be used such as a polyethylene glycol/polypropylene oxide adduct, ethoxylated alcohols such as polyethylene glycol ether of a secondary alcohol, ethoxylated alkylphenols such as polyethylene glycol ether of nonyl phenol, ethoxylated amides such as ethoxylated alkylol amides, ethoxylated amines such as ethoxylated tallow amine, ethoxylated fatty acids such as polyethylene glycol monooleate, ethoxylated fatty esters such as polyethylene oxide oleo ether, and ethylene oxide/methyl methacrylate copolymers.

Another aspect of this invention is the use of high molecular weight polyethylene glycols or adduct thereof having a weight average molecular weight of about 100,000–400,000 with hydrophobic silica to form the additive. Typically useful hydrophobic colloidal silicas have a surface area of about 100–500 square meters per gram and have at least two-thirds of the surface groups reacted with dimethyl siloxane.

The additive contains about 10–30% by weight, based on the weight of the additive, of an aromatic sulfonic acid and preferably 15–25% by weight of an aromatic sulfonic acid. These acids can have a single aromatic ring such as benzene derivatives or a diaromatic ring such as naphthalene compounds. Useful alkyl benzenesulfonic acids are decylbenzene sulfonic acid, dodecylbenzene sulfonic acid and paratoluene sulfonic acid. Dodecylbenzene sulfonic acid is preferred.

The additive also contains about 2–15% by weight, based on the weight of the additive of n-propyl amine and preferably 0.3–12% by weight of n-propyl amine. It has been found that this amine is unique and other amines do not provide the coating composition with good shelf life, i.e., good viscosity stability and finishes that are thoroughly cured on baking and have excellent gloss, excellent distinctness of image, reduced haze and absence of wrinkling.

Advantages of the additive in high solids coating compositions are as follows: the composition can be sprayed at a high solids level without sagging and running on the substrate to which it was applied; upon baking of the composition after application, the finish does not pull away from the edge of the substrate; craters are substantially reduced; the resulting finish is thoroughly cured and has excellent gloss and distinctness of image, no wrinkling, is clear and has a good appearance. When metallic flakes are used in the composition, the flakes are properly oriented and uniformly dispersed in the finish with a good two tone image and with little or no evidence of mottling caused by agglomeration of the metallic flakes. Also, the additive provides the composition with good shelf life.

Typical high solids coating compositions in which additive is used have a binder content of film-forming constituents of about 40–70% by weight. Generally, the composition has a binder content of about 50–60%. The composition contains about 30–60% by weight of a liquid carrier which generally is solvent for the binder. In addition, the composition contains 1–10% by weight, based on the weight of the composition, of the additive. Usually, the composition contains about 0.1–30% by weight, based on the weight of the composition, of pigment.

Preferably, the binder of the composition is an acrylic polymer having carboxyl, hydroxyl, amine, glycidyl groups or mixtures thereof and a number average molecular weight of about 500–30,000 and an alkylated melamine crosslinking agent.

Typically useful acrylic polymers contain alkyl methacrylate, alkyl acrylate, hydroxy alkyl acrylate, hydroxy alkyl methacrylate and can contain styrene, acrylic acid or methacrylic acid. Amide monomers such a methacrylamide and acrylamide can be used, glycidyl monomers such as glycidyl acrylate or glycidyl methacrylate can also be used.

Preferred acrylic polymers are of an alkyl methacrylate that has 1–18 carbon atoms in the alkyl group, an alkyl acrylate that has 2–18 carbon atoms in the alkyl group and a hydroxy alkyl acrylate or a hydroxy alkyl methacrylate each having 2–4 carbon atoms in the alkyl group. To form an acrylic polymer which has a hydroxyl content of about 2–10% by weight, a sufficient amount of the aforementioned hydroxy alkyl acrylate or methacrylate is utilized. The polymer also can contain small amounts of ethylenically unsaturated carboxylic acid, such as acrylic acid, methacrylate acid, itaconic acid, in amounts of about 0.1–5% by weight.

Typical alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate and the like.

Adhesion promoting monomers can also be used in the acrylic polymers such as diethyl aminoethyl methacrylate, tertiary butyl aminoethyl methacrylate, 3-(2-methacryloxy ethyl)-2,2-spiro cyclohexyl oxazolidene and the like.

Typical hydroxy alkyl acrylates and methacrylates which can be used to prepare the acrylic polymers are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, and the like.

The acrylic polymers can contain about 0.1–30% by weight of other constituents such as acrylonitrile, methacrylonitrile, acrylamide and methacrylamide, styrene or substituted styrene such as methyl styrene.

The acrylic polymers utilized in the coating composition are prepared by solution polymerization in which the monomers are blended with solvent, polymerization catalyst and optionally, a chain transfer agent, and heated to about 75°–150° C. for 1–6 hours to form a polymer that preferably has a number average molecular weight of about 500–20,000, a hydroxyl content of 2–10% by weight and a glass transition temperature of about −20° C. to +25° C.

To form films that have acceptable physical properties from these relatively low molecular weight acrylic polymers, the polymers generally have a hydroxyl content that is about two to three times higher than acrylic polymers used for conventional thermosetting compositions. The higher hydroxyl content provides additional crosslinking sites and films are formed that have excellent physical properties that are equivalent to and often better than films from conventional thermosetting acrylic compositions.

The number average molecular weight of the acrylic polymers is determined by gel permeation chromatography using polymethylmethacrylate as a standard.

The glass transition temperature of the polymers is determined by differential scanning colorimetry or is calculated.

One technique that is successfully used in preparing the acrylic polymers is a programmed addition of monomers, solvent, catalyst solution and optionally a chain transfer agent into a polymerization vessel at a given rate. These programmed additions can be manually calculated or calculated by a computer. This allows for the preparation of polymers having the optimum molecular weight. Optionally, the polymers can be terminated with the chain transfer agent at the desired low molecular weight. Also, if required, after the polymerization is completed, solvents can be stripped off to increase the polymer solids content of the resulting polymer solution.

Typical solvents which are used to prepare the acrylic polymer are the following: toluene, ethyl acetate, acetone, methyl isobutyl ketone, methyl amyl ketone methyl ethyl ketone, ethyl alcohol, mineral spirits, ethylene glycol monoethyl ether acetate, and other aliphatic, cycloaliphatic and aromatic hydrocarbon, esters, ethers, ketones, and alcohols. These solvents can also be used to reduce the resulting coating composition to a spray viscosity.

About 0.1-4% by weight, based on the weight of the monomers, of the polymerization catalyst is used to prepare the acrylic polymer. Typical catalysts are: azo-bis-isobutyronitrile, azo-bis(gamma dimethyl valeronitrile), benzoyl peroxide, t-butyl pivalate and the like.

A chain transfer agent can be used to control the molecular weight of the acrylic polymer. Typical chain transfer agents are 2-mercapto ethanol, dodecyl mercaptan, benzene thioethanol, mercapto succinic acid, butyl mercaptan, lauryl mercaptan, mercapto propionic acid and the like. When a transfer agent is used, the resulting acrylic polymer contains about 0.5-10% by weight of a chain transfer agent.

An alkylated melamine formaldehyde crosslinking resin is used in the composition. The alkylated melamine formaldehyde resin used generally has 1-4 carbon atoms in the alkyl group. The resin is prepared by conventional techniques in which an alcohol such as methanol, ethanol, propanol, isopropanol, butanol, isobutanol, tertiary butanol and the like is reacted with a melamine formaldehyde resin. The resin can be monomeric or polymeric. Preferred resins which give a high quality finish are fully alkylated melamine formaldehyde resins such as hexamethoxymethyl melamine and methoxy-butoxymethyl melamine. The fully alkylated resins require a strong acid catalyst such as dodecylbenzene sulfonic acid to properly cure the coating composition.

One particularly preferred high solids coating composition in which the additive of this invention is utilized comprises about 40-70% by weight of a biner of film-forming constituents and a non-aqueous liquid carrier; in which the binder of film-forming constituents consist essentially of (A) about 5-45% by weight of a medium molecular weight acrylic polymer having a number average molecular weight, determined by gel permeation chromatography, of about 5,000-20,000, a hydroxyl content of about 2%-10% by weight, a glass transition temperature of about −20° C. to +25° C. and consists essentially of
an alkyl methacrylate that has 1-18 carbon atoms in the alkyl group, a hydroxy alkyl acrylate, or a hydroxy alkyl methacrylate each having 2-4 carbon atoms in the alkyl group, and optionally, an alkyl acrylate that has 2-18 carbon atoms in the alkyl group or styrene and (B) about 10-50% by weight of a low molecular weight acrylic polymer having a number average molecular weight determined as above of about 500-7,500, a hydroxyl content of about 2%-10% by weight, a glass transition temperature of about −20° C. to +25° C. and consists essentially of
an alkyl methacrylate that has 1-18 carbon atoms in the alkyl group, a hydroxy alkyl acrylate, or a hydroxy alkyl methacrylate each having 2-4 carbon atoms in the alkyl group, and optionally, an alkyl acrylate that has 2-18 carbons in the alkyl group or styrene;
wherein the difference in molecular weight between the acrylic polymers is at least 3000; and (C) 25-45% by weight of fully alkylated melamine formaldehyde cross-linking resin having 1-4 carbon atoms in the alkyl group; and in addition to the above film-forming constituents contains about 1-10% by weight based on the weight of the composition of the additive of this invention.

Useful acrylic polymers for this preferred composition contain about 15-82% by weight of an alkyl methacrylate that has 1-4 carbon atoms in the alkyl group, preferably methyl methacrylate, 2-50% by weight of an alkyl acrylate that has 2-12 carbon atoms in the alkyl group and 16-35% by weight of a hydroxyl alkyl acrylate or a hydroxyl alkyl methacrylate each having 2-4 carbon atoms in the alkyl group. These polymers can contain up to 30% by weight of styrene which replaces a portion of the alkyl methacrylate. Also these polymers can contain an ethylenically unsaturated carboxylic acid.

Particularly useful acrylic polymers for this preferred composition comprises about 10-20% by weight styrene, 10-20% by weight methyl methacrylate, 35-48% by weight butyl acrylate, 20-30% by weight hydroxyl ethyl acrylate and 0.1-5% by weight of acrylic acid and have a number average molecular weight of 1,500-10,000. One preferred acrylic polymer of the above type contains about 16% styrene, 15.8% methyl methacrylate, 43% butyl acrylate, 25% hydroxy ethyl acrylate and 0.2% acrylic acid. Another useful acrylic polymer contains about 29% styrene, 21% methyl methacrylate, 32% butyl acrylate, 17% hydroxy ethyl acrylate and 1% acrylic acid.

Preferred medium molecular weight acrylic polymers have a number average molecular weight of about 5,000-16,000 and low molecular weight acrylic polymers have a number average molecular weight of about 1,500 to 7,000.

The aforementioned compositions can contain pigments. These pigments can be introduced into the composition by first forming a mill base with the acrylic polymer utilized in the composition or with other compatible polymers or polymeric dispersants by conventional techniques, such as sand-grinding, ball milling, attritor grinding, two roll milling to disperse the pigments. The mill base is blended with the film-forming constituents as shown in the following Examples.

Any of the conventional pigments used in the coating compositions can be utilized in this composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

Metallic flake pigments such as aluminum flakes can be used alone or with the aforementioned pigments in the coating compositions. Generally, about 0.1–5% by weight, based on the weight of the binder, of these metallic flake pigments are used.

Also, in addition to the above constituents, plasticizers in the amounts of 0.1–10% by weight, based on the weight of the binder, can be used in the composition. Plasticizers that can be used, are for example, butyl benzyl phthalate, dibutyl phthalate, triphenyl phosphate, 2-ethylhexyl benzyl phthalate, dicyclohexyl phthalate, diallyl phthalate, dibenzyl phthalate, butylcyclohexyl phthalate, mixed benzoic acid esters, fatty oil acid esters of pentaerythritol, poly-(propylene adipate)-dibenzoate, diethylene glycol dibenzoate, tetrabutylthiodisuccinate, butylphthalylbutyl glycolate, acetyltributyl citrate, dibenzylsebacate, tricresyl phosphate, toluene ethyl sulfonamide, and dimethylene cyclohexyl phthalate.

To improve weatherability of finishes of the coating compositions, about 0.1–10%, by weight, based on the weight of the binder, of an ultraviolet light stabilizer or a combination of ultraviolet light stabilizers can be added. Also, about 0.1–5% by weight, based on the weight of the binder, of an antioxidant can be added. Weatherability of finishes of coating compositions containing aluminum flake are particularly enhanced by the addition of ultraviolet light stabilizers and antioxidants. Also, about 0.1–10% by weight, based on the binder, of iron pyrophosphate can be added with ultraviolet light stabilizers and antioxidants to improve weatherability of finishes. Typically useful ultraviolet light stabilizers and antioxidants are disclosed hereinafter.

The coating composition containing the additive of this invention can be applied over a variety of substrates, such as metal, wood, glass, plastics, and the like, by any of the conventional application methods, such as spraying, electostatic spraying, dipping, brushing, flowcoating and the like. The viscosity of the composition can be adjusted for any of these methods by adding solvents if necessary. Generally, the composition is utilized at a high solids content which keeps air pollution at a minimum level.

After application to a substrate, the resulting coatings are baked at relatively low temperatures of about 125° C. and above for about 15 minutes, 2 hours. The resulting finish is about 0.1–5 mils thick but for most uses, a 1–3 mil thick finish is used. One technique that is used to insure that there will be no popping or cratering of the finish is to allow the solvents to flash off for about 15–30 seconds before a second coating is sprayed on or otherwise applied, then waiting from about 2–10 minutes before baking the coating to allow any residual solvents to flash off. The resulting finish has good gloss and can be rubbed or polished with conventional techniques to improve the smoothness, appearance and gloss. The finish has good adhesion to substrates of all types, is hard and resistant to weathering, solvents, alkali, scratches and the like. These characteristics make the composition particularly useful as a finish for automobiles, trucks, airplanes, railroad equipment, machines, outdoor equipment and the like.

Another aspect of this invention is to utilize the coating compositions containing the additive as a clear coat/color coat finish for substrates. In this finish, a clear coat top layer is in firm adherence to a color coat layer that is in adherence with a substrate. The clear coat is a transparent film of the coating composition and the color coat is the coating composition containing pigments in a pigment to binder ratio of about 1/100 to 150/100 and other additives.

Optionally, the color coat can contain about 0.1–10% by weight, based on the weight of the binder of the color coat, of an ultraviolet light stabilizer. Another option is that the color coat and the clear coat each can contain about 0.1–10% by weight, based on the weight of the binder of the coat, of an ultraviolet light stabilizer. Also, the clear coat or the color coat can contain about 0.1–5% by weight, based on the weight of the binder of the coat, of an antioxidant. When an antioxidant is used, the ratio of ultraviolet light stabilizer to antioxidant is about 1:1 to about 50:1.

Preferred, to form a durable finish, both the clear coat and the color coat contain about 5–8% by weight of an ultraviolet light stabilizer and optionally, about 0.1–1% by weight of the antioxidant and the ratio of ultraviolet light stabilizer to antioxidant is about 10:1.

Iron pyrophosphate can be added to either the clear coat or color coat or both in the aforementioned amounts to enhance weatherability of the clear coat/color coat finish.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–1.5 mils thick. Any of the aforementioned conventional pigments can be used in the color coat including metallic flake pigments can be used. The clear coat can also contain transparent refractive index as the binder of the clear coat and are of a small particle size of about 0.015–50 microns. Typical pigments that can be used in a pigment to binder weight ratio of about 1/100 to 10/100 of silica pigments. These pigments have a refractive index of about 1.4–1.61.

Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazines such as 2-phenyl-4-(2',4'-dihydroxylbenxoyl)-triazoles,2-[hydroxy-3',5'-(1,1-dimethylpropyl)-phenyl]benzotriazole, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl) benzene, metal derivatives of 3,5-di-t-butyl-4-hydroxy phenyl propionic acid, asymmetrical oxalic acid diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Typical antioxidants that are useful are as follows: tetrakis alkylene (di-alkyl hydroxy aryl)alkyl ester alkanes such as tetrakis methylene 3(3′,5′-dibutyl-4′-hydroxyphenyl)propionate methane, reaction product of p-amino diphenylamine and glycidyl methacrylate, reaction product of n-hexyl-N′-phenyl-p-phenylene diamine and glycidyl methacrylate, pentaerythritol tetrakis(thioglycolate), trimethylol propane tris(thioglycolate), trimethylol ethane tris(thioglycoate), N-(4-anilino phenyl) acrylamide and the like.

One preferred combination of ultraviolet light stabilizer and antioxidant is 2-hydroxy-4-dodecyloxy benzophenone or a substituted 2(2-hydroxyphenyl) benzotriazole and tetrakis methylene 3(3′,5′-dibutyl-4′-hydroxyphenyl) propionate methane.

The clear coat/color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following examples illustrate the invention. All parts and percentages are on a weight basis unless otherwise indicated. Molecular weights are determined by gel permeation chromatography using polymethyl methacrylate as the standard.

EXAMPLE I

A charcoal metallic paint was formulated by blending together in a conventional mixing vessel the following constituents in the order shown:

| | Parts By Weight |
|---|---|
| Xylene | 3.40 |
| Ethyl acetate | 4.54 |
| Amyl acetate | 3.78 |
| Butyl acetate | 6.29 |
| Ultraviolet Light Stabilizer solution (25% solids of 2-[2,hydroxy-3′,5-(1,1-dimethylpropyl)phenyl] benzotriazole) | 6.39 |
| Violet pigment dispersion (13.53% "Monastral"violet R pigment 39.98% methyl amyl ketone and 46.49% low molecular weight acrylic polymer of styrene, methyl methacrylate, n-butyl acrylate, hydroxyethylacrylate, acrylic acid in a weight ratio of 29/21/32/17/1 having a number average molecular weight of 6000) | 0.98 |
| Black pigment dispersion (11.7% furnace type carbon black pigment, 36.8% low molecular weight acrylic polymer described above, and 51.5% methyl amyl ketone) | 1.46 |
| Blue pigment dispersion (8.50% phthalocyanine blue pigment, 35.72% methyl amyl ketone and 55.78% acrylic polymer - described above) | 0.67 |
| White pigment dispersion (70% titanium dioxide, 16% methyl amyl ketone and 14% acrylic polymer-described above) | 0.17 |
| Coarse aluminum flake dispersion (24% coarse aluminum flake, 42.19% methyl amyl ketone and 33.81 medium molecular weight acrylic polymer of styrene, methyl methacrylate, butyl acrylate, hydroxyethyl acrylate, acrylic acid in a weight ratio of 29/21/32/17/1 having a number average molecular weight of 15,000) | 1.90 |
| Iron Pyrophosphate dispersion (22.2% iron pyrophosphate) 39.64% low molecular weight acrylic polymer described above, 38.16% methyl amyl ketone) | 3.46 |
| Fully methylated/butylated melamine formaldehyde resin | 16.52 |
| Hydrophilic silica dispersion (8.9% fumed colloidal hydrophilic silica having a surface area of 200 square meters per gram and an average diameter of 120 millimicrons, 49% of a fully methylated/butylated melamine formaldehyde resin 42.1% by weight of ethylene glycol monobutyl ether) | 6.48 |
| Low molecular weight acrylic resin solution (75% solids in methyl amyl ketone of the above described low molecular weight acrylic resin) | 29.19 |
| Medium molecular weight acrylic resin solution (60% solids in solvent mixture of aliphatic solvent, butanol, ethylene glycol monoethyl ether acetate and butyl acetate of the above described medium molecular weight acrylic polymer) | 12.79 |
| n-Propyl amine | 0.20 |
| Dodecylbenzene sulfonic acid | 0.26 |
| Methanol | 1.31 |
| Nonionic fluorocarbon polymer solution (10% polymer solids in methyl amyl ketone of a nonionic fluorocarbon polymer having about 50% by weight of ethylene oxide linkage and containing about 10–20% by weight fluorine and having a molecular weight of about 20,000 a number average molecular weight of about 4,400) | 0.21 |
| Total | 100.00 |

The above paint was reduced to a 40 second Fisher No. 2 cup viscosity with a mixture of xylene and ethyl acetate. The reduced paint was electrostatically sprayed with a Minibell electrostatic Spray Gun on a phosphatized steel panel coated with an alkyd resin primer and baked for 30 minutes at about 125° C. The resulting paint had a high gloss, a dry paint film thickness of about 2 mils and did not sag or pull away from the edge of the panel and had a good appearance.

A second coating of the paint was sprayed onto a separate phosphatized and primed steel panel and baked as above to provide a film about 3.5 mils thick which had excellent gloss, did not sag or pull away from the edges of the panel and had a good appearance.

Another paint was prepared using the same constituents and amounts as above except 2,2-dimethyl oxazolidine was substituted for the n-propyl amine. The paint was reduced to a spray viscosity as above, spray applied as above onto a separate steel panel phosphatized and primed as above and baked as above to provide a 2 mil thick finish. The resulting panel had an unacceptable finish because the finish had a poor gloss and had a poor appearance. Similar poor results were obtained by substituting di-n-propyl amine or tri-n-propyl amine for the n-propyl amine.

The following paints were prepared which were identical to the first paint prepared above with the following exceptions in the constituents used:

Paint No. 2-2,2-dimethyl oxazolidine (DMO) was substituted on an equal molar basis for the n-propyl amine (nPA).

Paint No. 3-paratoluene sulfonic acid, (PTSA) and 2,2-dimethyl oxazolidine were each substituted on an equal molar basis for dodecylbenzene sulfonic acid (DDBSA) and n-propyl amine, respectively.

Paint No. 4-polyethylene glycol (PEG) having a weight average molecular weight of about 8,000 was substituted on an equal molar basis for the nonionic fluorocarbon polymer (NFP).

Paint No. 5-polyethylene glycol having the above molecular weight and 2,2-dimethyl oxazolidine were each substituted on an equal molar basis for the nonionic fluorocarbon polymer and n-propyl amine, respectively.

Paint No. 6-polyethylene glycol having the above molecular weight 2,2-dimethyl oxazolidine and paratoluene sulfonic acid were each substituted on an equal molar basis for the nonionic fluorocarbon polymer, n-propyl amine and dodecylbenzene sulfonic acid, respectively.

The first paint prepared herein and the above paints 2–6 were each reduced to a spray viscosity and spray applied to primed steel panels described above and baked under the above conditions. Gloss of each of the panels was measured at 20° C. with a standard gloss meter, distinctness of image was measured and haze was measured on a Hunter Instrument. The results of these measurements are recorded below.

|  | 20° Gloss | Distinctness of Image | Haze |
|---|---|---|---|
| Paint No. 1 | | | |
| Amine - nPA | 86 | 78 | 0.6 |
| Catalyst - DDBSA | | | |
| Bridging - NFP | | | |
| Agent | | | |
| Paint No. 2 | | | |
| Amine - DMO | 85 | 73 | 0.7 |
| Catalyst - DDBSA | | | |
| Bridging - NFP | | | |
| Agent | | | |
| Paint No. 3 | | | |
| Amine - DMO | 82 | 48 | 0.9 |
| Catalyst - PTSA | | | |
| Bridging - NFP | | | |
| Agent | | | |
| Paint No. 4 | | | |
| Amine - nPA | 84 | 79 | 0.6 |
| Catalyst DDBSA | | | |
| Bridging - PEG | | | |
| Agent | | | |
| Paint No. 5 | | | |
| Amine - DMO | 84 | 71 | 0.7 |
| Catalyst - DDBSA | | | |
| Bridging - PEG | | | |
| Agent | | | |
| Paint No. 6 | | | |
| Amine - DMO | 79 | 53 | 1.7 |
| Catalyst PTSA | | | |
| Bridging PEG | | | |
| Agent | | | |

The above results show that when an amine other than n-propyl amine is used or when a catalyst other than dodecylbenzene sulfonic acid is used, 20° gloss and distinctness of image decrease and haze increases.

EXAMPLE No. 2

An almond metallic paint was formulated by blending together in a conventional mixing vessel the following constituents:

|  | Parts By Weight |
|---|---|
| Ultraviolet light stabilizer solution(described in Example 1) | 53.99 |
| Xylene | 123.16 |
| Yellow pigment dispersion (27.5% transparent iron oxide pigment, 38.0% of low molecular weight acrylic polymer described in Example 1 and 34.5% methyl amyl ketone) | 30.87 |
| White pigment dispersion (described in Example 1) | 1.96 |
| Red pigment dispersion(30.0% transparent iron oxide, 42.2% low molecular weight acrylic resin described in Example 1, 27.8% methyl amyl ketone) | 14.51 |
| Iron Pyrophosphate dispersion (described in Example 1) | 28.01 |
| Coarse aluminum flake dispersion (described in Example 1) | 18.22 |
| Medium aluminum flake dispersion (25% medium aluminum flake, 44.73% methyl amyl ketone and 30.27% medium molecular weight acrylic polymer described in Example 1) | 2.77 |
| Hydrophilic silica dispersion (described in Example 1) | 107.98 |
| Fully methylated/butylated melamine formaldehyde resin | 113.04 |
| Medium molecular weight acrylic resin solution (described in Example 1) | 184.76 |
| Low molecular weight acrylic resin solution (described in Example 1) | 115.40 |
| Methanol | 12.15 |
| Polyethylene glycol solution (10% solids in methanol of polyethylene glycol having a weight average molecular weight of about 8,000) | 4.05 |
| n-propyl amine | 5.06 |
| Dodecylbenzene sulfonic acid | 6.07 |
| Total | 822.00 |

The above paint was reduced to a 40 second Fisher No. 2 cup viscosity with a mixture of xylene and ethyl acetate. The reduced paint was electrostatically sprayed with a Minibell electrostatic Spray Gun on a phosphatized steel panel coated with an alkyd resin primer and baked for 30 minutes at about 125° C. The resulting paint had a high gloss, a dry paint film thickness of about 2 mils and did not sag or pull away from the edge of the panel and had a good appearance.

A second coating of the paint was sprayed onto a separate phosphatized and primed steel panel and baked as above to provide a film about 3.5 mils thick which has excellent gloss, did not sag or pull away from the edges of the panel and had a good appearance.

Another paint was prepared using the same constituents and amounts as above except 2,2-dimethyl oxazolidine was substituted for the n-propyl amine. The paint was reduced to a spray viscosity as above, spray applied as above onto a separate steel panel phosphatized and primed as above and baked as above to provide a 2 mil thick finish. The resulting panel had an unacceptable finish because the finish had a poor gloss and had a poor appearance.

Two additional paints were prepared identical to the first paint except in one paint the nonionic fluorocarbon polymer described in Example 1 was substituted for the polyethylene glycol solution and in the second paint a polyvinyl pyrrolidone polymer solution in which the polymer had a weight average molecular weight of about 160,000. Both paints were reduced to a spray viscosity as above and each applied to separate steel panels primed as above and each panel was baked as above. In each case the resulting paint had a high gloss, a dry film thickness of about 2 mils and did not sag or pull away from the edges and in general each had a good appearance.

I claim:

1. An additive for coating compositions consisting essentially of about
   a. 50–87.5% by weight, based on the weight of the rheology control additive, of colloidal hydrophilic silica having a particle size of about 0.2–1000 millimicrons and has a surface area of about 50–1200 square meters per gram,
   b. 0.5–5.0% by weight, based on the weight of the rheology control additive, of a polymeric bridging agent selected from the group consisting of nonionic fluorocarbon polymer having ethylene oxide linkages and a weight average molecular weight of about 5,000–50,000 and containing about 2–25% by weight, based on the weight of the fluorocarbon polymer, of fluorine, a polyvinyl pyrrolidone having a weight average molecular weight of about 3,000–500,000, or a polyethylene glycol having a weight average molecular weight of about 800–400,000,
   c. 10–30% by weight, based on the weight of the rheology control additive, of an aromatic sulfonic acid and
   d. 2–15% by weight, based on the weight of the rheology control additive, of n-propyl amine.

2. The additive of claim 1 in which the aromatic sulfonic acid is dodecylbenzene sulfonic acid.

3. The additive of claim 1 in which the aromatic sulfonic acid is paratoluene sulfonic acid.

4. The additive of claim 1 in which the bridging agent is a nonionic fluorocarbon polymer having about 30–70% by weight ethylene oxide linkages and about 10–20% by weight of fluorine and having a weight average molecular weight of about 10,000–30,000 and the aromatic sulfonic acid is the dodecylbenzene sulfonic acid.

5. The additive of claim 1 in which the bridging agent is polyvinyl pyrrolidone having a weight average molecular weight of about 100,000–400,000 and the aromatic sulfonic acid is dodecylbenzene sulfonic acid.

6. The additive of claim 1 in which the bridging agent is a polyethylene glycol having a weight average molecular weight of about 6,000–10,000 and the aromatic sulfonic acid is dodecylbenzene sulfonic acid.

7. A coating composition comprising about 40–70% by weight of a binder of film-forming constituents and about 30–60% by weight of a nonaqueous liquid carrier, wherein the binder comprises a film-forming resin containing reactive carboxyl groups, hydroxyl groups, amide groups, glycidyl groups or a mixture of any of these groups and an alkylated melamine formaldehyde crosslinking agent; and in addition the composition contains about 1–10% by weight, based on the weight of the binder, of the additive of claim 1.

8. The coating composition of claim 7 in which the film-forming resin is an acrylic resin comprising an alkyl methacrylate, an alkyl acrylate, a hydroxy alkyl methacrylate or a hydroxy alkyl acrylate, and an alkylated melamine formaldehyde resin.

9. The coating composition of claim 8 which contains in addition about 0.1–30% by weight of pigment.

10. The coating composition of claim 9 which contains about 0.1–5% by weight of metallic flake pigment.

11. The coating composition of claim 10 in which the metallic flake pigment is aluminum flake.

12. A coating composition comprising about 40–70% by weight of a binder and about 30–60% by weight of a solvent for the binder containing about 0.1–30% by weight pigment and in addition about 0.1–10% by weight, based on the weight of the binder, of the additive of claim 1, wherein the binder consists essentially of
   (a) about 5–45% by weight of a medium molecular weight acrylic polymer having a number average molecular weight, of about 5,000–20,000, a hydroxyl content of about 2–10% by weight, a glass transition temperature of about −20° C. to +25° C. and consisting essentially of methyl methacrylate, an alkyl methacrylate or an alkyl acrylate each having 2–18 carbon atoms in the alkyl group and a hydroxyl alkyl acrylate or a hydroxy alkyl methacrylate each having 2–4 carbon atoms in the alkyl group;
   (b) about 10–50% by weight of a low molecular weight acrylic polymer having a number average molecular weight determined as above of about 500–7,500, a hydroxyl content of about 2–10% by weight, a glass transition temperature of about −20° C. to +25° C. and consisting essentially of methyl methacrylate or an alkyl methacrylate or an alkyl acrylate each having 2–18 carbon atoms in the alkyl group and a hydroxy alkyl acrylate or a hydroxy alkyl methacrylate each having 2–4 carbon atoms in the alkyl group; and
wherein the difference in molecular weight between the acrylic polymers is at least 3000; and
   (c) about 25–45% by weight of an alkylated melamine formaldehyde cross-linking agent having 1–4 carbon atoms in the alkyl group.

13. The coating composition of claim 12 in which the acrylic polymers contain about 0.1–30% by weight of styrene.

14. The coating composition of claim 12 in which the acrylic polymers consists essentially of
   15–82% by weight of methyl methacrylate, 2–50% by weight of an alkyl acrylate having 2–12 carbon atoms in the alkyl group, and 16–35% by weight of a hydroxy alkyl acrylate or a hydroxy alkyl methacrylate, each having 2-4 carbon atoms in the alkyl group.

15. The coating composition of claim 13 in which each of the acrylic polymers consists essentially of
10-20% by weight of styrene,
10-20% by weight of methyl methacrylate,
35-48% by weight of butyl acrylate,
20-30% by weight of hydroxyl ethyl acrylate and
0.1-5% by weight of acrylic acid.

16. The coating composition of claim 14 or 15 in which the cross-linking agent is methylated/butylated melamine formaldehyde resin.

17. The coating composition of claim 12 containing about 0.1-10% by weight, based on the weight of the binder, of an ultraviolet light stabilizer.

18. The coating composition of claim 17 containing about 0.1-5% by weight, based on the weight of the binder, of an antioxidant.

19. The coating composition of claim 7 in which the binder of film-forming resin is a blend of an acrylic resin and a polyester resin and the crosslinking resin is an alkylated melamine formaldehyde resin.

* * * * *